(12) United States Patent
Whistler

(10) Patent No.: US 8,195,703 B1
(45) Date of Patent: Jun. 5, 2012

(54) SYSTEM AND METHOD FOR STORAGE OF DISPARATE ITEMS BY A DATABASE

(75) Inventor: Kenneth Whistler, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 721 days.

(21) Appl. No.: 12/326,674

(22) Filed: Dec. 2, 2008

(51) Int. Cl.
*G06F 7/00* (2006.01)
*G06F 17/30* (2006.01)

(52) U.S. Cl. ........ 707/796; 707/803; 707/805; 707/806; 707/807; 707/808

(58) Field of Classification Search .................. 707/791, 707/793, 796, 802, 803, 805, 806, 807, 808
See application file for complete search history.

(56) References Cited

U.S. PATENT DOCUMENTS

| | | | | |
|---|---|---|---|---|
| 5,508,912 A * | 4/1996 | Schneiderman | | 705/3 |
| 5,809,297 A * | 9/1998 | Kroenke et al. | | 1/1 |
| 6,539,386 B1 * | 3/2003 | Athavale et al. | | 1/1 |
| 6,606,637 B1 * | 8/2003 | Hill et al. | | 1/1 |
| 6,721,763 B1 * | 4/2004 | Pekowski et al. | | 707/804 |
| 7,130,885 B2 * | 10/2006 | Chandra et al. | | 709/206 |
| 2006/0015839 A1 * | 1/2006 | Owens et al. | | 717/100 |
| 2006/0031259 A1 * | 2/2006 | Gibson et al. | | 707/104.1 |
| 2008/0263072 A1 * | 10/2008 | Koskas | | 707/101 |

* cited by examiner

*Primary Examiner* — Jean B Fleurantin
*Assistant Examiner* — Mark Hershley

(57) ABSTRACT

A computer program for inventorying a items with attributes. The items are recorded as encoded items by the program. The program maintains a contents table with attribute records each with an identity field, a name field, and a value field. There is an interface for inputting and retrieving item attribute values. Each encoded item is assigned a unique identity value. Each encoded item is represented by one or more attribute records, each storing (1) the unique identity value in the identity field, (2) an attribute type value associated with a particular attribute in the name field, and (3) an encoded value associated with the particular attribute in the value field.

12 Claims, 8 Drawing Sheets

| (record number) | Attributes | Class |
|---|---|---|
| 1 | alias | Control |
| 2 | contains | Control |
| 3 | Manufacturer | Common |
| 4 | SerialNumber | Common |
| 5 | Location | Common |
| 6 | ExpirationDate | Software |
| 7 | AmplifierGain | power |

FIG. 1
(PRIOR ART)

| ItemId | 12345 |
| Price | 111.22 |
| Quantity | 34 |
| OrderDate | 2006/07/03 11:12 |
| Address1 | 123 Main Street |
| Address2 | Suite 300 |
| City | Springfield |
| State | IL |
| ZipCode | 55555 |
| LastName | Smith |
| FirstName | James |
| HomePhone | 222-765-4321 |

FIG. 2
(PRIOR ART)

| *CustomerNumber* | *111* |
| ItemId | 12345 |
| Price | 111.22 |
| Quantity | 34 |
| OrderDate | 2006/07/03 11:12 |

(a)

| *CustomerNumber* | *111* |
| Address1 | 123 Main Street |
| Address2 | Suite 300 |
| City | Springfield |
| State | IL |
| ZipCode | 55555 |
| LastName | Smith |
| FirstName | James |
| HomePhone | 222-765-4321 |

| Identity | AttributeName | AttributeValue | DateChanged | Employee | MostRecent |
|---|---|---|---|---|---|
| 0123 | alias | VirtualStorageArea | 2006/07/12 11:52:16 | Kenneth Whistler | False |

FIG. 4

| (record number) | Attributes | Class |
|---|---|---|
| 1 | alias | Control |
| 2 | contains | Control |
| 3 | Manufacturer | Common |
| 4 | SerialNumber | Common |
| 5 | Location | Common |
| 6 | ExpirationDate | Software |
| 7 | AmplifierGain | power |

FIG. 5

| (record number) | Identity | AttributeName | AttributeValue | DateChanged | Employee | MostRecent |
|---|---|---|---|---|---|---|
| 1 | 0123 | alias | Power Supply | 2006/07/12 11:52:16 | Kenneth Whistler | True |

FIG. 6

| (record number) | Identity | AttributeName | AttributeValue | DateChanged | Employee | MostRecent |
|---|---|---|---|---|---|---|
| 1 | 0123 | alias | Power Supply | 2006/07/12 11:52:16 | Kenneth Whistler | True |
| 2 | 0123 | Manufacturer | Smith Power Company | 2006/07/12 11:53:06 | Kenneth Whistler | True |
| 3 | 0123 | SerialNumber | WE232X | 2006/07/12 11:53:06 | Kenneth Whistler | True |

FIG. 7

| (record number) | Identity | AttributeName | AttributeValue | DateChanged | Employee | MostRecent |
|---|---|---|---|---|---|---|
| 1 | 0123 | alias | Power Supply | 2006/07/12 11:52:16 | Kenneth Whistler | True |
| 2 | 0123 | Manufacturer | Smith Power Company | 2006/07/12 11:53:06 | Kenneth Whistler | True |
| 3 | 0123 | SerialNumber | WE232X | 2006/07/12 11:53:06 | Kenneth Whistler | True |
| 4 | AAAA | alias | Rack 1 | 2006/07/12 11:55:02 | Kenneth Whistler | True |
| 5 | AAAA | Location | Laboratory AAA | 2006/07/12 11:55:02 | Kenneth Whistler | True |
| 6 | BBBB | alias | Rack 2 | 2006/07/12 11:56:22 | Kenneth Whistler | True |
| 7 | BBBB | Location | Basement Storage | 2006/07/12 11:56:22 | Kenneth Whistler | True |

FIG. 8

| (record number) | Identity | AttributeName | AttributeValue | DateChanged | Employee | MostRecent |
|---|---|---|---|---|---|---|
| 1 | 0123 | alias | Power Supply | 2006/07/12 11:52:16 | Kenneth Whistler | True |
| 2 | 0123 | Manufacturer | Smith Power Company | 2006/07/12 11:53:06 | Kenneth Whistler | True |
| 3 | 0123 | SerialNumber | WE232X | 2006/07/12 11:53:06 | Kenneth Whistler | True |
| 4 | AAAA | alias | Rack 1 | 2006/07/12 11:55:02 | Kenneth Whistler | True |
| 5 | AAAA | Location | Laboratory AAA | 2006/07/12 11:55:02 | Kenneth Whistler | True |
| 6 | BBBB | alias | Rack 2 | 2006/07/12 11:56:22 | Kenneth Whistler | True |
| 7 | BBBB | Location | Basement Storage | 2006/07/12 11:56:22 | Kenneth Whistler | True |
| 8 | AAAA | contains | 0123 | 2006/07/12 11:58:22 | Kenneth Whistler | True |

FIG. 9

| (record number) | Identity | AttributeName | AttributeValue | DateChanged | Employee | MostRecent |
|---|---|---|---|---|---|---|
| 1 | 0123 | alias | Power Supply | 2006/07/12 11:52:16 | Kenneth Whistler | True |
| 2 | 0123 | Manufacturer | Smith Power Company | 2006/07/12 11:53:06 | Kenneth Whistler | True |
| 3 | 0123 | SerialNumber | WE232X | 2006/07/12 11:53:06 | Kenneth Whistler | True |
| 4 | AAAA | alias | Rack 1 | 2006/07/12 11:55:02 | Kenneth Whistler | True |
| 5 | AAAA | Location | Laboratory AAA | 2006/07/12 11:55:02 | Kenneth Whistler | True |
| 6 | BBBB | alias | Rack 2 | 2006/07/12 11:56:22 | Kenneth Whistler | True |
| 7 | BBBB | Location | Basement Storage | 2006/07/12 11:56:22 | Kenneth Whistler | True |
| 8 | AAAA | contains | 0123 | 2006/07/12 11:58:22 | Kenneth Whistler | False |
| 9 | *BBBB* | *contains* | *0123* | *2006/07/12 11:59:31* | *Kenneth Whistler* | *True* |

FIG. 10

| (record number) | Identity | AttributeName | AttributeValue | DateChanged | Employee | MostRecent |
|---|---|---|---|---|---|---|
| 6 | BBBB | alias | Rack 2 | 2006/07/12 11:56:22 | Kenneth Whistler | True |
| 7 | BBBB | Location | Basement Storage | 2006/07/12 11:56:22 | Kenneth Whistler | True |
| 9 | BBBB | contains | 0123 | 2006/07/12 11:59:31 | Kenneth Whistler | True |

FIG. 11

| (record number) | Identity | AttributeName | AttributeValue | DateChanged | Employee | MostRecent |
|---|---|---|---|---|---|---|
| 1 | 0123 | alias | Power Supply | 2006/07/12 11:52:16 | Kenneth Whistler | True |
| 2 | 0123 | Manufacturer | Smith Power Company | 2006/07/12 11:53:06 | Kenneth Whistler | True |
| 3 | 0123 | SerialNumber | WE232X | 2006/07/12 11:53:06 | Kenneth Whistler | True |

SYSTEM AND METHOD FOR STORAGE OF DISPARATE ITEMS BY A DATABASE

FIELD OF THE INVENTION

The present subject matter relates to inventorying items in a relational database, in particular where there are disparate items being inventoried.

BACKGROUND

In a conventional relational database schema for storing data related to disparate items, multiple tables are created; one table for each type of item having a unique attribute structure. Each table contains a number of records, each record containing a number of fields defined by its respective table. Each field of a record can store an associated value. A benefit of relational databases is savings in storage space resulting from encapsulating common information that might otherwise be repeated across multiple records. Instead of repeating the common information, an additional table is created to store the common information, the table including a key field used to provide a unique identifier for each record in the table. Then, records in other tables that wish to refer to the common information include a key field used to reference the common record. When accessing data for a record, the relational database can use such key field entries to locate and present information from records in multiple tables as if it had been stored in one contiguous table.

A typical example of this technique involves storing data associated with customer orders. It is common that an individual customer might place more than one order. In this situation, creating a single table for customer orders, as illustrated in FIG. 1, that not only includes fields for order information, but further includes fields for customer information, such as a customer's mailing address, would result in multiple copies of the customer information where there are multiple orders associated with a single customer. Thus, the information is split across two tables, as illustrated in FIG. 2. The first table, containing record (a), stores information regarding customer orders, containing fields associated with orders, such as the kinds of items ordered, their respective quantities, and prices. The second table, containing record (b), stores customer information, with fields associated with the individual customers, such as name, address, and phone number. Additionally, each of the two tables contains a key field, identified as "CustomerNumber" in FIG. 2. In the customer information table, a key field is used to uniquely identify each customer. In the customer order table, a key field is used to reference records in the customer information table. When referring to a customer order, the key field in the customer order record is used to look up a respective record in the customer information table, thus providing the name, address, and phone number of the customer associated with the order. It is also possible to locate or relate records in the opposite direction. By locating all customer order records referring to a particular customer information record, one can retrieve all of the orders associated with the customer. The relational database structure also helps maintain the data consistency. By storing only one copy of the common data in the table associated with record (b), to make changes only the single shared record needs to be updated, rather than multiple records, possibly across multiple tables, in a database.

As described above, employing the a conventional database solution requires separate tables for each item type, with various key fields for cross-referencing various records. Unfortunately, this approach quickly becomes cumbersome when using a database to describe a very broad range of different types of items. It becomes even more cumbersome when further attempting to describe "assemblies" of items within other items. For example, one may wish to use a database to manage an inventory that accurately represents the grouping or nesting of items, such as devices placed in equipment racks, where there are many different types of devices being tracked, with the types possessing unique characteristics of interest. Under a conventional relational database approach, a solution would employ separate device tables for each device type, each including key fields to track the relationships of devices, such as grouping or clustering of devices. For instance, in order to maintain an inventory of electrical power conditioning equipment the database table might contain fields to record attributes such as device_name, serial_number, device_type, and manufacturer. The electrical power conditioning equipment might be contained in a rack assembly with other equipment such as a computer. The attributes used to describe the electrical equipment might be used to describe the computer, but additional fields may be needed to record other attributes of the computer, such as operating_system, Storage_Capacity and Programs_Loaded. Further, the entire rack assembly could be part of a subsystem of racks collectively known as a cluster. To record this, a table with a record for each rack assembly might have the attributes rack_number and cluster_name. When one device is moved out of a cluster for repair, data in respective key fields are changed to reflect its new state. Any key fields reflecting the state may have to be updated in multiple records, depending on the relationships of various items, and how the relationships are recorded by the database.

There is a need for recording information regarding a disparate collection of items in a more compact manner than a conventional relational database schema. Additionally, there is a need to record changes in relationships between items recorded in a database that reduces the number of records that must be updated to record such changes.

SUMMARY

In one example, there is a computer program for inventorying a plurality of items, with each item possessing one or more attributes and recorded as a respective encoded item by the program, comprising: a contents table comprising a plurality of attribute records, each attribute record comprising an identity field, a name field, and a value field, with each field storing a respective value; and an interface for inputting encoded values of item attributes and retrieving encode values of item attributes; wherein: each encoded item has an associated identity value which is unique among the plurality of encoded items; each encoded item is represented by an alias group comprising one or more attribute records, each storing the identity value associated with its respective encoded item in its identity field; and each attribute record encodes an attribute of its respective encoded item by storing an attribute type value associated with the attribute in its name field and storing an encoded value associated with the attribute in its value field.

In another example, there is a computer program for recording attributes of each of a plurality of encoded items, which performs the steps of: maintaining a contents table comprising a plurality of attribute records, each attribute record comprising an identity field, a name field, and a value field, with each field storing a respective value; determining a unique identity value for an encoded item; determining an attribute type value for an attribute of the encoded item; receiving an encoded value for the attribute of the encoded item; creating a new attribute record for the attribute and storing the identity value of the encoded item associated with the attribute in its identity field and storing the attribute type value in its name field; storing a value associated with the attribute in the value field of the new attribute record.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1 illustrates a record from a database structure in which order and customer information fields are stored in a single table.

FIG. 2 illustrates the data of FIG. 1, but stored in records of two tables, with an identifier linking the two records.

FIG. 3 is an illustration of a Contents Table according to the first example.

FIG. 4 is an illustration of an Attributes Table according to the first example.

FIG. 5 illustrates the Contents Table of the first example with an encoding of an encoded item.

FIG. 6 illustrates the encoded item of FIG. 5 with additional attributes.

FIG. 7 illustrates the encoding of two encoded items in addition to that of FIG. 6.

FIG. 8 illustrates the representation of a container in the Contents Table of the first example.

FIG. 9 illustrates the movement of a contained encoded item from one container to another.

FIG. 10 illustrates the records returned by a particular Query A performed on the Contents Table illustrated in FIG. 9.

FIG. 11 illustrates the records returned by a particular Query B performed on the Contents Table illustrated in FIG. 9.

DETAILED DESCRIPTION

Figure 12:
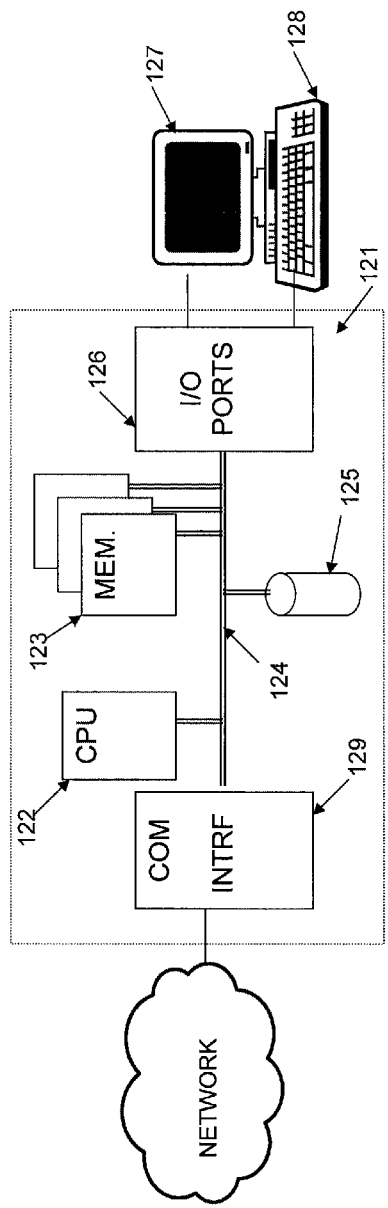
FIG. 12 is a simplified functional block diagram of a computer.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and components have been described at a relatively high-level, without detail, in order to avoid unnecessarily obscuring aspects of the present teachings.

Techniques are disclosed below with respect to a particular example for physical inventory control. A practical application of an inventory database is to provide a simple way to keep track of the status and assembly of physical objects regardless of the number of attributes required to categorize them, or which or how many attributes different physical objects have in common.

Creating an Inventory Database

The first example comprises a commercial database program, such as Microsoft SQL Server, two tables maintained by the database, and a user interface, the user interface comprising program code to insert, delete, and query records in the tables maintained by the database. The representation of an item and its attributes in the tables maintained by database is known as an "encoded item."

The first table is the Contents Table, a record of which is illustrated in FIG. 3. The Contents Table includes at least three fields: (1) a field to contain a unique identifier for an encoded item (identified as "Identity"); (2) a field identifying an attribute of an encoded item, with an attribute type, to be stored in the database (identified as "AttributeName"); and (3) a field for storing a value corresponding to the attribute (identified as "AttributeValue"). Each record in the Contents Table is known as an "attribute record." In some examples the value stored in the "Identity" field might also be used as an inventory control number for an inventory control system. For example, physical items might bear labels including their respective inventory control number and a corresponding bar code.

In addition to the above three fields, the Contents Table of the first example further includes an additional three fields to enable tracking of changes made to the database. In the depicted example, the three additional fields are: (1) a field to record the identity of a database operator who creates or modifies a record in the Contents Table (identified as "Employee"), (2) a field to record the time at which a record was created in the Contents Table (identified as "DateChanged"), and (3) a boolean field to indicate that a particular record contains a current, rather than some earlier, value associated with the attribute identified by the AttributeName field (identified as "MostRecent"). Attribute records that do not have a MostRecent field value of "False" are called "current" attribute records.

The second table is the Attributes Table, which is illustrated in FIG. 4. It includes at least one field to contain an identifier, or attribute type, of attributes used to describe encoded items (called "Attributes" in the depicted example). Each record in the Attributes Record is known as a "type record." Each record in the Contents Table has an attribute type value for AttributeName with a corresponding record in the Attributes Table with the same attribute type value stored in the Attributes field. Thus, when adding a record to the Contents Table to record an attribute of an encoded item, if the desired attribute type to be stored in the AttributeName field does not have a corresponding record in the Attributes Table, a new record is added to the Attributes Table in which the Attributes field is set to the new attribute type value.

In addition to the Attributes field, the Attributes Table of the first example includes an additional field allowing for the grouping or categorization of attributes (identified as "Class"). One or more records in the Attributes Table may have the same Class value, which indicates the attributes are in a group. Class values allow grouping of attributes into attribute classes so that they may be readily identified as relevant for describing an encoded item. Class values also allow for grouping attributes according to their functionality. The Class may be thought of as a record viewing filter that restricts the results of a database query. As an example, attributes pertaining to software such as version, operating system, installation date or compatibility might belong in the same Class. When searching for information about computers stored in the database the class filter can be used to return records pertaining to software only and not also about the computer's other attributes such as storage location, manufacturer name, serial number and so forth.

In the first example, the Attributes Table has two required records: a first record with an Attributes value of "contains," and the second record with an Attributes value of "alias." These two records are both given the Class value "control," indicating they are used for managing the identities or relationships of encoded items. The "alias" attribute is used to provide a convenient description of an encoded item. The "contains" attribute is used to represent nesting of encoded items, as discussed in detail below. Other attributes might be helpful in the inventory control context of the first example might be used to describe equipment generally, such as "Manufacturer," "SerialNumber," and "Location," as illustrated in FIG. 4. Since these attributes are common to all equipment they are given the Class value "common." Attributes relevant to more specific types of equipment, such as "ExpirationDate" for software, would be grouped under their own class value.

One feature of the above approach is that to add attributes to existing encoded items, the database structure itself need not change. Instead, a new type record is added to the Attributes Table for the new attribute to be stored. In contrast, in a conventional relational database schema, employing separate tables for different types of items, once a substantial number of records exists in such a system, significant computer resources may be required to revise existing tables to add new item attributes.

Encoding Items in the Inventory Database

In order to track a piece of equipment with the inventory system of the first example, an operator begins by creating an attribute record in the Contents Table, as illustrated in FIG. 5. This record includes a unique identity number (which, as noted above, might also serve as a number on a bar-encoded inventory sticker) stored in the Identity field, and a "label," or a more convenient or useful description than the Identity value, for the equipment stored in the AttributeValue field, along with a value of "alias" stored in the AttributeName field. This alias attribute provides another, generally more convenient, label or identifier for the item than what is stored in the Identity field. It is intended that the alias attribute is unique for each encoded item, so that, like the value of the Identity field, it may be used as a unique identifier for the encoded item in database queries. The AttributeName field for the "alias" attribute record could also use an arbitrary symbol such as "A" to indicate it is an alias record. The word "alias" or a symbol such as "A" serves as an operator indicating an alias relationship between the Identity value and the Attribute Value.

The entire set of records in the Contents Table with a common Identity field value are known as an "Alias Group." Thus, each encoded item is represented by one or more attribute records in the Contents Table. This set of records represents all of the attribute data that has been encoded for the encoded item associated with the Identity field value. Alias Groups can be identified by their common Identity value, or alternatively by their common alias attribute value, assuming that a unique value has been assigned to the alias attributes corresponding to each Alias Group.

The minimum representation for an encoded item is a single attribute record with a Identity value unique to the encoded item, AttributeName="alias," and a unique, but ideally descriptive, name in the AttributeValue field, which is illustrated by the encoded item of FIG. 5. This attribute record is referred to as the "alias record." An Alias Group, which represents an encoded item, can be identified by the unique value stored in the Identity field of its respective attribute records, or by the unique name stored in the AttributeValue of its respective alias record. In other words, the Identity value stored in an alias record is a link value to all other attribute records which describe an item.

The Employee field is automatically updated by the inventory system when creating a record or modifying an existing record, based on information obtained a result of a user logging into the system. Also, the DateChanged field is automatically updated by the inventory system when creating a record or modifying an existing record. The status of the MostRecent field is also automatically maintained by the system when adding the record to the database. Where an attribute is already encoded in an attribute record and is being modified, the MostRecent field in the existing record is marked as "False," and the MostRecent field of a new attribute record containing the updated attribute information is marked as "True." An attribute record with a MostRecent field value of "True" is known as a "current record." When querying the database for the current value (or values) of an attribute, records with a MostRecent field value of "False" are ignored. As previously existing, but no longer current, attribute records are not deleted, but instead are marked with a MostRecent value of "False," the database maintains a history of modifications to encoded items and their attributes. The inventory database can be queried for the "history" of an encoded item by sorting on the AttributeName and DateChanged fields of the attribute records in its Alias Group. If the current value of a given attribute is needed, a query on the AttributeName and MostRecent field being "True" will produce the current record (or records).

Adding and Modifying Attributes of Encoded Items

Adding the single alias attribute record to the Contents Table is sufficient to record the existence of an encoded item. However, the database becomes more useful as further attributes are added to encoded items. Adding other attributes is done much as discussed above with respect to the "alias" attribute, but with different values for the AttributeName field, selected from the attribute types enumerated in the Attributes Table, representing respective attributes of an encoded item.

The Attributes Table is useful where an operator is presented with a graphical user interface (GUI) for entering encoded items and their attributes into the inventory database. Based on a known or user-selected class of item to be inventoried, attributes relevant to that item can be determined by locating Attribute Table records with a corresponding Class field value. Then the operator might be presented with a number of blank attribute value fields to populate, or perhaps a set of menu options for adding attributes to the encoded item based on the attribute types in its corresponding class. As described above, for each encoded attribute, a new record is added to the corresponding Alias Group. Additionally, the GUI may offer the opportunity to add other attributes to the item not associated with its corresponding Class value, or add a new attributes both to the encoded item and its corresponding Class, by adding a new record to the Attributes Table.

To describe a new attribute, not currently listed in the Attributes Table, a record is added to the Attributes Table, with the Attributes field set to an identifier for the new attribute. Then attribute records are added to the Contents Table with the AttributeName field set with the identifier.

In some situations, multiple attribute records in an Alias Group with the same AttributeName value will be "current."

Such a situation is illustrated below by "container" attribute, where an encoded item may "contain" one or more other encoded items.

Modifying a currently encoded attribute is accomplished by locating the corresponding attribute record, and setting its MostRecent field value to "False," indicating that the record is no longer current. Then, a new attribute is added with the MostRecent field value set to "True," as discussed above. In an example in which the MostRecent field is not employed, the corresponding attribute record is either simply modified, or deleted, after which a new attribute record is created as discussed above.

To eliminate an attribute from an encoded item, the MostRecent field value of the corresponding attribute record is set to "False," indicating that the record is no longer current. In an example in which the MostRecent field is not employed, the corresponding attribute record is simply deleted from the Contents Table.

FIG. 6 illustrates a further encoding of the power supply item of FIG. 5, with Identity of 0123, in an inventory database. The attribute records in the Alias Group for this item can be seen in records 1-3 of the Contents Table. This particular item was manufactured by Smith Power Company, as indicated by record number 2, which has a value of "Manufacturer" in its AttributeName field. The power supply also has a serial number of WE232X, as seen in record number 3.

FIG. 7 depicts the contents of the Contents Table after adding two more items to the inventory: Rack 1 (Identity value "AAAA") located in Laboratory AAA, and Rack 2 (Identity value "BBBB") located in Basement Storage.

Container-Oriented Inventory

In many situations, encoded items are not independent of one another. Instead, items are often contained within other items, with the containing items also of interest for inventorying. For example, a desktop computer comprises a number of subcomponents, such as hard drives and keyboards, which may be of independent interest for inventorying purposes. In some other situations, items of inventory might be stored in boxes or on shelves. By recording that the items are in the box, tracking the location of the containing box enables finding the recorded contents. Recording such relationships is performed using a "contains" attribute, with a value of the Identity of the "contained" encoded item. Attribute records with a AttributeName field value of "contains" are known as container records. An Alias Group comprising a container record is a "container." A container, by way of respective container records, refers to one or more Alias Groups which it "contains." The Alias Groups which are referred to by the container records of a container are "contained" by the container. The AttributeName field for the container record could also use an arbitrary symbol such as "C" to indicate it is an container record. The word "container" or a symbol such as "C" serves as an operator indicating a containment relationship between encoded items.

In view of the above, it should be appreciated by those skilled in the art that a reverse "contained" relation can be encoded, indicating that a given encoded item is contained by another encoded item, either in addition to or as an alternative to the above "contains" relationship. Generally, only one of the "contains" or "contained" relationship is employed, as maintaining both "contains" and "contained" relationships can impose unwanted overhead in verifying these relationships when, for example, encoded items are moved.

To have an Alias Group contained by another (to encode the assembly of items in a container), an attribute record is added to the Contents Table, with the Identity field set to the Identity value associated with the containing Alias Group, the AttributeName field set to "contains," and the AttributeValue field set to the Identity value associated with the contained Alias Group.

FIG. 8, building on the inventory illustrated in FIG. 7, illustrates such a relationship. In this example, encoded item Power Supply is mounted in equipment rack AAAA. This relationship is encoded by record number 8 in the Contents Table, which has an AttributeName field value of "contains" and AttributeValue field value of "0123."

As discussed previously, there is no requirement for there to be only one current record for a particular attribute in Alias Group (in other words, there may be more than one attribute record with MostRecent=True and identical values in the Identity and AttributeName fields). For example, equipment rack AAAA might contain an additional power supply, 0124. To represent this, there would be an additional attribute record with Identity=AAAA, AttributeName=contains, and AttributeValue=0124. Where multiple Alias Groups are contained by a single Alias Group, they are known as a "group." An Alias Group comprising at least one current attribute record with an AttributeName field value of "contains" is called a "container," and "contains" the encoded items identified in the AttributeValue fields of the corresponding attribute records.

In some situations, an Alias Group may be contained by more than one Alias Group.

Additionally, other relationships between encoded items might be encoded, such as an indication of incompatibility between encoded items.

Containers may be contained by other containers, in which case they are "nested."

All contained Alias Groups are also moved by virtue of being contained by a moved Alias Group.

As with other attribute records, the history of containment and movement of an item is maintained by the container records in the Alias Group encoding the item. Container records with a MostRecent field value of "False" (not current) provide the history for the item prior to what is encoded in a current container record.

In the container-oriented inventory system, all encoded items can be thought of as assemblies that stand alone, contain other assemblies, or are contained in other assemblies. The grouping or nesting of assemblies is not restrained, and does not increase the complexity of the database used to store them.

Moving an Encoded Item to a Different Container

The first example not only records in what container an encoded item was initially placed, but also tracks it as it moves over its lifespan. For example, it may be desired to move Power Supply 0123 into equipment rack BBBB. To indicate this new arrangement, a query is performed on the database for any records matching the criteria AttributeName="contains," AttributeValue="0123," and MostRecent="True," to locate any records indicating that a respective Alias Group contains the item identified as "0123." In records matching the query, such as record number 8 in FIG. 9, the MostRecent field of the records is set to "False," indicating that the attribute record is no longer current. In that situation, Power Supply 0123 no longer contained by equipment rack AAAA. Then, a new attribute record is created in the Alias Group associated with equipment rack BBBB with AttributeName="contains" and AttributeValue="0123," as illustrated by record number 9 in FIG. 9.

Types of Alias Groups Within a Container-Oriented Inventory

Figure 14:
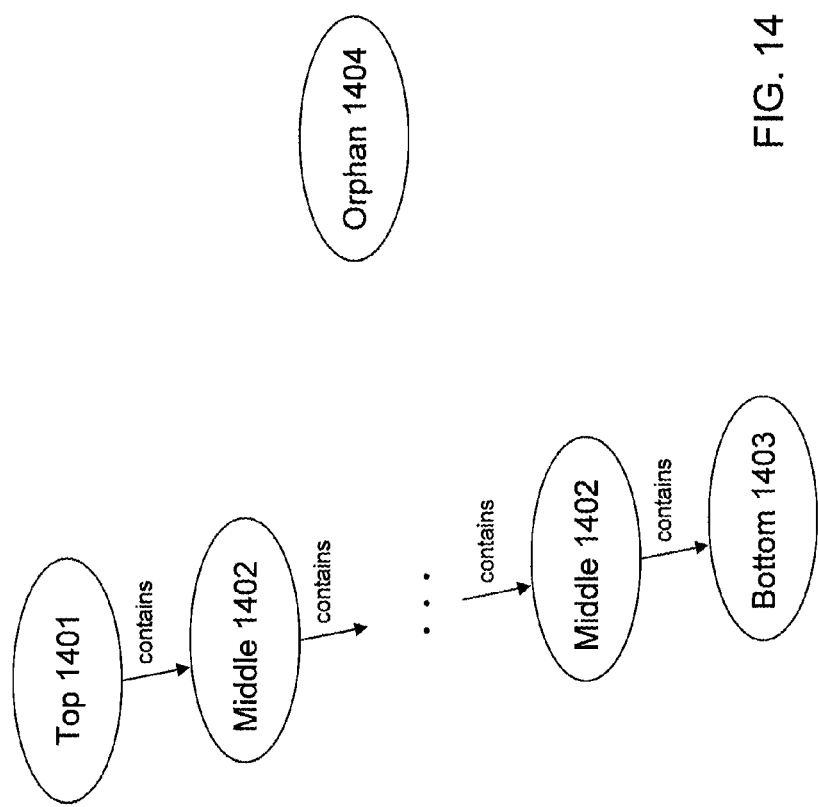
FIG. 14 illustrates relationships of a number of Alias Groups and containers.

In the first example, there are four types of Alias Groups with respect to their roles as containers and being contained by containers: top containers, middle containers, bottom containers, and orphans. FIG. 14 illustrates relationships of a number of Alias Groups and containers.

Top containers 1401 are containers of other Alias Groups, but are not contained by another Alias Group. In other words, they have at least one current attribute record with an AttributeName of "contains," but the Identity value associated with the Alias Group does not appear as an AttributeValue in any attribute record with an AttributeName of "contains" in any other Alias Group.

Middle containers 1402 are containers of other Alias Groups, and are contained by other Alias Groups as well. In other words, they have at least one current attribute record with an AttributeName of "contains," and the Identity value associated with the Alias Group appears as an AttributeValue in an attribute record with an AttributeName of "contains" in at least one other Alias Group.

Bottom containers 1403 are not containers of other Alias Groups, but are contained by other Alias Groups. In other words, they do not have a current attribute record with an AttributeName of "contains," but the Identity value associated with the Alias Group appears as an AttributeValue in an attribute record with an AttributeName of "contains" in at least one other Alias Group.

Orphans 1404 are not containers of other Alias Groups, and are not themselves contained by another Alias Group. In other words, they do not have a current attribute record with an AttributeName of "contains," and the Identity value associated with the Alias Group does not appear as an AttributeValue in any attribute record with an AttributeName of "contains" in any other Alias Group.

In the example described above, all encoded items can be described by a fixed number of fields and contained in only two tables, regardless of the quantity and names of the attributes required to describe and link encoded items. Additionally, container-based descriptors enable the gathering of records with disparate field widths into common assemblies and reassignment of these assemblies as top containers, containers, or contained assemblies, while preserving their unique attribute structure. Further, by including fields to record an operator, a timestamp, and indicator for the most recently changed record, the assembly and containment history of encoded items can also be maintained.

Iterative Traversal of Container-Oriented Inventory

The container records of the first example result in a tree-like structure for containing and contained items. It is possible to traverse this tree-like structure, finding encoded items contained by a given encoded item or finding containers containing a given item, and determining certain properties of the collection of items.

In the container-oriented scheme, the Class of the attribute could indicate a physical property so that an attribute of the container itself can be thought of as being cumulative. One practical application is accumulating a property of each item in the database so that the combined effect of their assembly can be determined. By way of example, the weight of a box that contains cans of paint is the total of the weight of the box itself (an attribute of the container) plus the weight of each of the cans of paint inside the container. Each can of paint has its own weight consisting of the can itself and the weight of the paint inside it. As cans are removed or added the total box weight changes. Since containers are connected, they can be thought of as a network of connections. As the connections are traversed by iterative querying, any value of an attribute that appears in each Alias Group can pass an effect to the items that it contains.

In the container-oriented database scheme, an AttributeName of "weight" with a corresponding AttributeValue in an agreed upon measurement unit for weight can be assigned to the box, the cans and the paint. As the contents of the Top container (the box) change, the total box weight can be determined by retrieving and summing up the AttributeValue of all database records contained in the Top Container with an AttributeName of "weight"

Further, an attribute of the container itself can be thought of as propagating through the assembly of containers. In another example, a signal transmission system, such as CATV, comprises an originating source with a signal level measured in decibels relative to a millivolt reference (known as dBm). The signal transmission system comprises an Antenna to gather the off-air signal connected to an amplifier to boost the signal level to one suitable for distribution. The boosted signal may travel through wires or coaxial cable of a known length with a known loss of signal level per unit distance, such as each 1000 meters. After traveling some distance through the wires or cable, the signal level may have to be boosted up to a useful value by an amplifier with a known level of gain, measured in dBm. The signal may have to be distributed to several outlets by a splitter, each outlet connected to respective cables with their own length and loss values. Finally, the signal arrives at a Receiver at a given signal level. If the signal level at the receiver is sufficient, the signal can be put to use.

For a designer of such a transmission system, the challenge is to arrange the components of the system so that based on a given level at the antenna, the required signal at the receiver, and the distance between the two, a suitable arrangement of amplifiers, splitters, and cables can be determined. Conversely, if a segment of the signal path is changed, the resulting changes in signal level from the point of change can be determined.

Expressing signal gain in dBm has the advantage of being additive. When a system component amplifies or increases the signal, the dBm of its gain is added to the input signal level to calculate the output signal level of the device. Losses caused by a system component are expressed as negative gains.

Using a container-oriented schema, the designer can describe the system components as containers with a gain value and accumulate the signal gain along the path leading to a bottom container. For the case of amplifiers that boost the signal level, the AttributeName of "Gain" will suffice. For wires or cables that have loss as a function of length, two AttributeNames are used: "Length" and "Lossper_length" expressed in suitable units, such as 2000 meters and 40 dBm per 1000 meters. A cable with those particular attribute values has a "Gain" of −80 dBm. For passive units, such as signal splitters, the AttributeName of "Gain" will suffice. The splitter may have several output connections, each with a respective gain. Only one output connection leads to the Receiver. In this scheme, the Receiver is contained by the amplifiers, cables and splitter output connections.

To calculate the total system loss the designer retrieves all container records containing the bottom container (the Receiver) that are related to the signal gain or loss of the containers.

As the tree-like database structure is traversed, actions of calculating and accumulating the gains and losses of each container occur based on AttributeName values for each container. For a given Receiver, the resulting overall signal path has a final gain value expressed as a positive or negative number. Given the signal level at the input and the system gain, it can be determined if the resulting signal level at the bottom container (the Receiver) is sufficient to be useful. If the signal level is too strong, amplifier gain may be reduced. If it is not strong enough, amplifier gains might be increased, or a different series of components, with respective containers, may be connected so as to have less signal loss, such as adding additional amplifiers.

This technique can be applied to any attributes, such as distance, electrical resistance, loss, and cost. In another example, each encoded item might include a monetary value attribute. By traversing the encoded items with use of the "contains" operator, it is possible to accumulate a total monetary value for the encoded items at a particular location or globally. Additional attributes may be encoded to indicate calculations such as a summation or an average are to be performed during the traversal. A variety of monetary values may be used, include an original purchase price, sale price, deprecated value, or replacement cost.

In another example, attribute values can encode actions to be taken while traversing the tree-like structure. This allows determining an appropriate sequence of actions to perform based on the relationships and attributes of the encoded items.

In an additional example, the tree-like structure can be thought of as a route with a chosen container as a destination or endpoint and the containers as connections or streets to be traversed to the endpoint. In this scheme the containers are equivalent to streets and the operator of containment is an operator of connection. When the desired container (the destination) is chosen, the database is searched for containers connected between it and the container for the current position or starting point. The resulting tree-like structure is the route of connections. If the route changes, the current connection container is moved to a new starting point and chain of connections database is again searched for new connections to the endpoint. Other attributes about the route can be encoded such as street name, distance, speed limit, points of interest and directionality. A traveler could then follow the list of connections as a list of street names and turning points to the destination Operations Performed with an SQL-Based Database System Using a traditional SQL-based database system to search for and identify containers generally requires the use of nested or recursive queries. A nested query is one that depends on the outcome of an "inner" query to supply an argument for another "outer" query. Referring to the containers illustrated in FIG. 9, in order to list the elements of "Rack 2" it is necessary to first find the Identity value of an alias record with an AttributeValue field value of "Rack 2." Using the Identity value returned from that query (BBBB), then all the records in the same Alias Group are found by listing all those with an Identity field value of "BBBB." Assuming a table named "containers" is the Contents Table described above, in standard SQL an appropriate query is illustrated by Query A:

Query A: Select Identity, AttributeName, AttributeValue from containers where Identity in (select Identity from containers where AttributeName='alias' and AttributeValue='Rack 2' and MostRecent='True') and MostRecent='True'

This type of query shows the properties of an Alias Group, including whether it is a container. The result of the portion of the query inside the parentheses (the "inner" query) is the Identity field value "BBBB." When that value is used by the rest of the query (the "outer" query) the result is as depicted in FIG. 10. In order to find the contents of the items that "Rack 2" contains, one continues nesting queries, as illustrated by Query B:

Query B: Select Identity, AttributeName, AttributeValue from containers where Identity in (Select AttributeValue from containers where identity in (select Identity from containers where AttributeName='alias' AttributeValue='Rack 2' and MostRecent='True') and MostRecent='True ' and AttributeName='contains' and MostRecent='True') and MostRecent='True'.

The result of the query within the innermost parenthesis is the value "BBBB," as in the "inner" query of Query A. The query within the outermost parenthesis returns the AttributeValue value "0123" from record 9, which indicates that BBBB contains 0123. The remaining, outermost part of the query obtains the contents of the Alias Group whose Identity is "0123," including whether it contains any further encoded items. The result is illustrated in FIG. 11. Since the result from this query has no 'contains' records, but is contained by another Alias Group, Identity "0123" is a bottom container. In order to find out if a container is a Top Container, the Identity of an Alias Group with a container record must not show up as a result of a query searching through the AttributeValue field of any "contains" attribute record.

As can already be seen with Queries A and B above, nested queries can quickly become very large. As most SQL databases have a practical limit to the size of a query, an alternative is employing an iterative process, feeding the result of one query into another. Iterative processes run the risk of not terminating by entering an infinite loop. To avoid this situation, supervising software should perform checks to ensure that a given container may not contain itself nor may it contain any other container that contains itself. Such supervision might occur upon entering items into the database, or when performing an iterative search. For example, the Contents Table should not contain any current container records in which the values in the Identity and AttributeValue fields are equal. More indirect loops may exist within the container relationships of items, which may pose the problem of infinite looping depending on the length of the loop and the queries applied against it Methods for identifying such loops are well known in the art. The Contents Table should also contain no unbroken iterative chains following the 'contains' records.

Hardware

FIG. 12 is a functional block diagram of a PC based implementation of an inventory system 121, which may serve as a user terminal. The exemplary system 121 contains a central processing unit (CPU) 122, memories 123 and an interconnect bus 124. The CPU 122 may contain a single microprocessor (e.g. an x86 microprocessor), or it may contain a plurality of microprocessors for configuring the computer system 122 as a multi-processor system. The memories 123 include a main memory, such as a dynamic random access memory (DRAM), as well as a read only memory, such as a PROM, an EPROM, a FLASH-EPROM, or the like. The system 121 also includes mass storage devices such as various disk drives, tape drives, etc. The main memory typically includes dynamic random access memory (DRAM) and high-speed cache memory. In operation, the main memory stores at least portions of instructions and data for execution by the CPU 122.

The mass storage may include one or more magnetic disk or tape drives or optical disk drives, for storing data and instructions for use by CPU 122. For a home PC, for example, at least one mass storage system 125 in the form of a disk drive or tape drive, stores the operating system and application software as well as data, such as received messages and documents. The mass storage 125 within the computer system 121 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 121.

The system 121 also includes one or more input/output interfaces for communications, shown by way of example as an interface 129 for data communications via the network 23. The interface 129 may be a modem, an Ethernet card or any other appropriate data communications device, for digital communications of various types via a network. The physical communication links may be optical, wired, or wireless (e.g., via satellite, cellular, or WLAN network).

The computer system 121 may further include appropriate input/output ports 126 for interconnection with a display 127 and a keyboard 128 serving as the respective user interface. For example, the computer may include a graphics subsystem to drive the output display 127. The output display 127 may include a cathode ray tube (CRT) display or liquid crystal display (LCD). The input control devices for such an implementation of the system 121 would include the keyboard 128 for inputting alphanumeric and other key information. The input control devices for the system may further include a cursor control device (not shown), such as a mouse, a trackball, stylus, or cursor direction keys. The links of the peripherals 127, 128 to the system 121 may be wired connections or use wireless communications.

Each computer system 121 runs a variety of applications programs and stores data, enabling one or more interactions via the user interface, provided through elements such as 127 and 128, and/or over the network to implement the desired processing for the inventory service or the processing of requests for inventory services.

Figure 13:
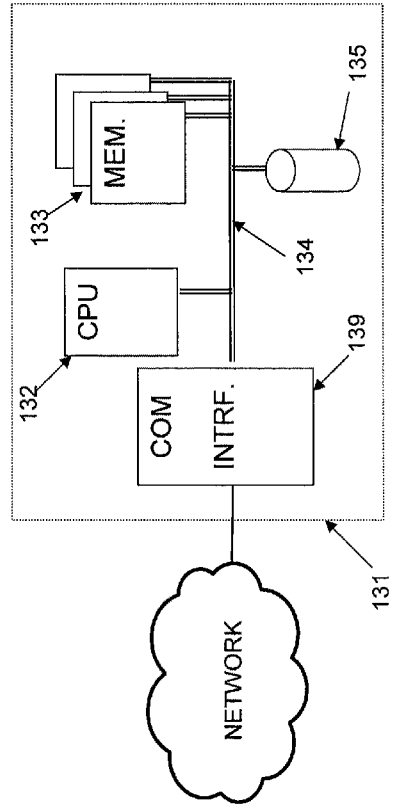
FIG. 13 is a simplified functional block diagram of a general-purpose computer system.

FIG. 13 is a functional block diagram of a general-purpose computer system 131, which may perform the functions of the server for storage of the inventory database, or the like.

The exemplary computer system 131 contains a central processing unit (CPU) 132, memories 133 and an interconnect bus 134. The CPU 132 may contain a single microprocessor, or may contain a plurality of microprocessors for configuring the computer system 132 as a multi-processor system. The memories 133 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 132.

The mass storage may include one or more magnetic disk or tape drives or optical disk drives, for storing data and instructions for use by CPU 132. At least one mass storage system 135, preferably in the form of a disk drive or tape drive, stores the database used for the inventory service. The mass storage 135 may also include one or more drives for various portable media, such as a floppy disk, a compact disc read only memory (CD-ROM), or an integrated circuit non-volatile memory adapter (e.g., a PC-MCIA or USB adapter) to input and output data and code to and from the computer system 131.

The system 131 also includes one or more input/output interfaces for communications, shown by way of example as an interface 139 for data communications via a network. The interface 139 may be a modem, an Ethernet card or any other appropriate data communications device. To provide the inventory service to a large number of users, the interface 139 preferably provides a relatively high-speed link to the network The physical communication link may be optical, wired, or wireless (e.g., via satellite, cellular, or WLAN network). Alternatively, the computer system may comprise a mainframe or other type of host computer system.

Although not shown, the system 131 may further include appropriate input/output ports for interconnection with a local display and a keyboard or the like serving as a local user interface. Alternatively, the server operations personnel may interact with the system 131 for control and programming of the system from remote terminal devices via the network link.

The computer system 131 runs a variety of applications programs and stores the database. Those skilled in the art will recognize that the computer system 131 may run other programs and/or host other database services. As such, the system 131 need not sit idle while waiting for inventory service related functions. Also, the system 131 may be implemented as a single computer system or as a distributed system having multiple appearances at different nodes on the network.

The components contained in the computer systems 121 and 131 are those typically found in general purpose computer systems used as servers, workstations, personal computers, network terminals, and the like. In fact, these components are intended to represent a broad category of such computer components that are well known in the art.

Certain aspects of the invention relate to the software elements, such as the executable code and/or database software used to implement the inventory functions. These functions may reside on different physical systems, linked by local or wide area communications networks.

At different times all or portions of the executable code or database for any or all of these software elements may reside in storage media or be carried by electromagnetic media. The various data components as well as other files relating to the inventory system developed may reside in or be transported via a variety of different media. Physical media include the memory of the computer processing systems 121, 131, such as various semiconductor memories, tape drives, disc drives and the like of general-purpose computer systems. All or portions of the software may at times be communicated through via a network or various other telecommunication networks. Such communications, for example, may be to load the software from another computer (not shown) into a server or into another network element. Thus, another type of media that may bear the software elements includes optical, electrical and electromagnetic waves, such as used across physical interfaces between local devices, through wired and optical landline networks and over various air-links.

Hence, operations described above may be carried out by execution of software, firmware, or microcode operating on a router or computer of any type. Additionally, code for implementing such operations may be in the form of computer instruction in any form (e.g., source code, object code, interpreted code, etc.) stored in or carried by any computer or machine readable medium.

At different times all or portions of the executable code for any or all of these programming elements may reside in storage media or be carried by electromagnetic media. Storage media include the memory of the wireless controller or of memory or other storage elements of computer processing systems that may supply programming to the wireless controller, such as various semiconductor memories, tape drives, disc drives and the like. All or portions of the software may at times be communicated through the Internet or various other telecommunication networks. Such communications, for example, may be to load the software or an update thereof from a computer (not shown) into the wireless controller. Thus, another type of media that may bear the software elements includes optical, electrical and electromagnetic waves, such as used across physical interfaces between local devices, through wired and optical landline networks and over various air-links.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A non-transitory computer-readable medium having a computer program stored thereon for inventorying a plurality of physical items, each item possessing one or more attributes and recorded as a respective encoded item in a relational database by the computer program, comprising:
   a contents table comprising a plurality of attribute records, each attribute record comprising an identity field, a name field, a value field, and a current field, with each field storing a respective value; and
   an interface for inputting encoded values of item attributes and retrieving the encoded values of item attributes;
   wherein:
   each encoded item has an associated identity value which is unique among the plurality of encoded items;
   each encoded item is represented by an alias group comprising one or more attribute records, each attribute record storing the identity value associated with its respective encoded item in its identity field;
   each attribute record encodes an attribute of its respective encoded item by storing an attribute type value associated with the attribute in its name field and storing an encoded value associated with the attribute in its value field;
   each current field stores a value indicating whether or not its respective attribute record contains a current value for the respective attribute;
   an attribute of an encoded item is represented by an attribute group comprising one or more attribute records, with the same attribute type value stored in the name field of each of the attribute records of the attribute group;
   a relationship between first and second encoded items is represented by encoding an attribute in an attribute record of the alias group associated with the first encoded item, the attribute record storing an attribute type value associated with the relationship in its name field and storing a value which identifies the second encoded item in its value field;
   the relationship indicates that the first encoded item contains the second encoded item; and
   a value is calculated for a plurality of encoded items of interest including the first encoded item, by traversing the encoded items of interest using the relationship and accumulating intermediate values based on attributes of the encoded items of interest, where each of the encoded items of interest, except for the first encoded item, is contained by another encoded item of interest and has an intermediate value according to the attribute of the encoded item.

2. The medium as recited in claim 1, the attribute records of the contents table further comprising:
   a creation time field that stores the time at which it's respective attribute record is created, and
   an operator field that stores an identifier associated with an operator that caused its respective attribute record to be created; wherein
   when assigning a new value to a currently encoded attribute, a current attribute record corresponding to the attribute being assigned a new value stores a value in its current field indicating that the current attribute record does not contain a current value for the respective attribute, and a new attribute record is created which stores the new value.

3. The medium as recited in claim 1, wherein
   a first alias group includes an attribute record which relates a unique identifier, other than the identity value, with the first alias group.

4. The medium as recited in claim 1, further comprising:
   an attributes table comprising a plurality of type records, each type record comprising a type field storing a respective value; wherein:
   for each unique value stored in the name fields of the plurality of attribute records there is a respective type record storing the unique value in its type field.

5. The medium as recited in claim 4, wherein: the type records each further comprise a class field; and
   there is at least one plurality of type records which store the same value in their respective class fields.

6. A method for recording attributes of each of a plurality of physical items encoded in a relational database, comprising the steps of:
   maintaining a contents table comprising a plurality of attribute records, each attribute record comprising an identity field, a name field, a value field, and a current field, with each field storing a respective value;
   determining a unique identity value for each encoded item;
   determining attribute type values corresponding to each attribute recorded for each encoded item;
   receiving encoded values corresponding to each attribute;
   storing the value of each attribute by creating a new attribute record, storing the unique identity value of the encoded item associated with the corresponding attribute in its identity field, storing the corresponding attribute type value in its name field, storing the encoded value corresponding to the corresponding attribute in its value field, and storing a value indicating that the new attribute record currently contains a valid value in its current field;
   representing a relationship between first and second encoded items by encoding an encoded attribute in an attribute record associated with the first encoded item, the attribute record storing an attribute type value associated with the relationship in its name field and storing a value which identifies the second encoded item in its value field, wherein the relationship indicates that the first encoded item contains the second encoded item; and
   calculating a value for a plurality of encoded items of interest including the first encoded item, by traversing the encoded items using the relationship and accumulating intermediate values based on attributes of the encoded items of interest, wherein each of the encoded items of interest, except for the first encoded item, is contained by another encoded item of interest and has an intermediate value according to the attribute of the encoded item.

7. The method of claim 6, further comprising the step of assigning a new attribute value to a currently encoded attribute by storing a value in the current field of the attribute record currently encoding the attribute indicating that the attribute record currently encoding the attribute no longer contains a valid value, and storing the new attribute value in accordance with the storing step; wherein
   each attribute record further comprises a creation time field and an operator field; and when creating a new attribute record, storing the time at which the attribute record is created in the creation time field, and storing an identifier associated with an operator that caused the new attribute record to be created in the operator field.

8. The method of claim 6, further comprising the steps of:

maintaining an attributes table comprising a plurality of type records, each type record comprising a type field storing a respective value; and adding a type record to the attributes table for each unique attribute type value stored in the contents table.

9. The method of claim 8, in which the attributes table further comprises a class field storing a respective value, and further comprising the step of:

grouping type records by storing a common value in their respective class fields.

10. A computer readable storage medium comprising computer executable instructions which, when executed by a computer, cause the computer to perform steps for inventorying a plurality of physical items, the steps comprising:

maintaining a contents table in a relational database comprising a plurality of attribute records, each attribute record comprising an identity field, a name field, a value field, and a current field, with each field storing a respective value;

determining a unique identity value for each encoded item;

determining attribute type values corresponding to each attribute recorded for each encoded item;

receiving encoded values corresponding to each attribute;

storing the value of each attribute by creating a new attribute record, storing the identity value of the encoded item associated with the corresponding attribute in its identity field, storing the corresponding attribute type value in its name field, storing the encoded value corresponding to the corresponding attribute in its value field, and storing a value indicating that the new attribute record currently contains a valid value in its current field;

representing a relationship between first and second encoded items by encoding an encoded attribute in an attribute record associated with the first encoded item, the attribute record storing an attribute type value associated with the relationship in its name field and storing a value which identifies the second encoded item in its value field, wherein the relationship indicates that the first encoded item contains the second encoded item; and calculating a value for a plurality of encoded items of interest including the first encoded item, by traversing the encoded items using the relationship and accumulating intermediate values based on attributes of the encoded items of interest, wherein each of the encoded items of interest, except for the first encoded item, is contained by another encoded item of interest and has an intermediate value according to the attribute of the encoded item.

11. The computer readable storage medium of claim 10, further comprising the steps of:

maintaining an attributes table comprising a plurality of type records, each type record comprising a type field storing a respective value; and adding a type record to the attributes table for each unique attribute type value stored in the contents table.

12. The computer readable storage medium of claim 11, in which the attributes table further comprises a class field storing a respective value, further adapted to perform the step of:

grouping type records by storing a common value in their respective class fields.

\* \* \* \* \*